United States Patent [19]

Akahori et al.

[11] Patent Number: 4,668,949
[45] Date of Patent: May 26, 1987

[54] PAGER RECEIVER COMPRISING A MESSAGE DETECTOR ENERGIZED ONLY AT PERTINENT TIME SLOTS

[75] Inventors: Masaaki Akahori, Tokyo; Hiroshi Watanabe, Miyagi, both of Japan

[73] Assignees: Nippon Electric Co., Ltd.; Nippon Telegraph & Telephone Public Corporation, both of Japan

[21] Appl. No.: 834,130

[22] Filed: Feb. 26, 1986

Related U.S. Application Data

[63] Continuation of Ser. No. 455,931, Jan. 6, 1983, abandoned.

[30] Foreign Application Priority Data

Jan. 20, 1982 [JP] Japan .................................. 57-7809

[51] Int. Cl.⁴ ............................................... G08B 1/00
[52] U.S. Cl. ........................... 340/825.47; 340/825.44; 340/825.48; 455/35
[58] Field of Search ...................... 455/35–37, 455/31, 343; 340/825.44–825.48; 179/2 EC, 18 BF

[56] References Cited

U.S. PATENT DOCUMENTS 4,417,246 11/1983 Agmor et al. ................. 340/825.44
4,437,095 3/1984 Akahori et al. ..................... 455/343

*Primary Examiner*—Ulysses Weldon
*Attorney, Agent, or Firm*—Laff, Whitesel, Conte & Saret

[57] ABSTRACT

In a pager receiver (12) of a paging system, a reception controller (21) is kept operable when a switch (22) is closed. A first transistor (31) energizes a receiver part (16, 17) at the beginning of a call code part of a received calling signal. If a calling code for that receiver is detected at a certain call time slot of the call code part, the first transistor keeps the energization until the end of that call code part and again energizes the receiver part during a message time slot corresponding to that call time slot in a message code part which next follows that call code part in the received calling signal. A second transistor (32) energizes a display part (26–28) a little before that message time slot. If a message code is detected at that message time slot, the second transistor keeps the energization to generate an alert tone and a visual display. As soon as a blank message pattern is detected at that message time slot, the second transistor suspends the energization. It is preferred that a calling code for any one of pager receivers of the system be placed nearer to the call code part beginning and that a blank call pattern be placed in each call time slot where no calling code is present. As soon as the blank call pattern is detected, the first transistor suspends the energization without waiting the call code part end.

3 Claims, 5 Drawing Figures

PAGER RECEIVER COMPRISING A MESSAGE DETECTOR ENERGIZED ONLY AT PERTINENT TIME SLOTS

This is a continuation of U.S. patent application Ser. No. 455,931, filed Jan. 6, 1983, now abandoned.

BACKGROUND OF THE INVENTION

This invention relates to a pager or paging receiver for use in a paging system. More particularly, the pager receiver is of the type which is not only for informing the user of a call but also is capable of displaying a message or the like.

While carried by the user movable within a service area of a paging system and rendered active or operative, a pager receiver must always be ready for detecting a call which may reach that pager receiver at any time from a transmitting station of the system on a radio calling signal. The power for use in receiving the radio calling signal and indicating the call, is supplied from a battery carried by the receiver.

In order to reduce the power consumption in the receiver, it is customary to resort to the battery saving scheme as called in the art. According to the scheme, pager receivers of the paging system, either rendered active or kept inactive, are divided into a predetermined number of groups. Each frame of the radio calling signal is divided into a plurality of subframes which are allotted to the respective groups as will later be described with reference to a few figures of the accompanying drawing. A conventional pager receiver for use in such a paging system comprises a receiver circuit for receiving the radio calling signal and for detecting a calling code preassigned to the receiver under consideration and an on-off control circuit for automatically energizing the receiver circuit only during the subframe allotted to the group which includes the receiver in question.

On the other hand, it is a recent trend to make the radio calling signal include a message code which accompanies the calling code for a pager receiver and is representative of a message to be conveyed to that pager receiver. An example of such a pager receiver is disclosed by Alfred B. Levine in U.S. Pat. No. 4,336,524. The subframe becomes accordingly long. As will become clear as the description proceeds, it has now been found possible to unexpectedly save the battery in such a pager receiver.

SUMMARY OF THE INVENTION

It is therefore a general object of the present invention to provide a pager receiver which is capable of receiving a message and in which the power consumption is reduced to a minimum.

It is a specific object of this invention to provide a pager receiver of the type described, in which the power consumption is further reduced when the traffic is not busy.

According to this invention, there is provided a pager receiver comprising first through fourth means as follows.

The first means is for receiving a radio calling signal comprising a call code part and a message code part. The call code part has a preselected number of call time slots. The message code part has a plurality of message time slots which correspond to the call time slots, respectively. The call time slots and the message time slots are time sequentially arranged.

The second means is coupled to the first means for detecting a calling code preassigned to the pager receiver and for deciding that one call time slot of the call time slots in which the calling code is detected.

The third means is coupled to the first means through the second means for detecting either of a message code and a blank message pattern in one message time slot of the message time slots that corresponds to the aforementioned one call time slot.

The fourth means is responsive to the above-described one call time slot for energizing the first and the third means substantially at a leading edge of the above-mentioned one message time slot.

DESCRIPTION OF THE PREFERRED EMBODIMENTS

Figure 1:
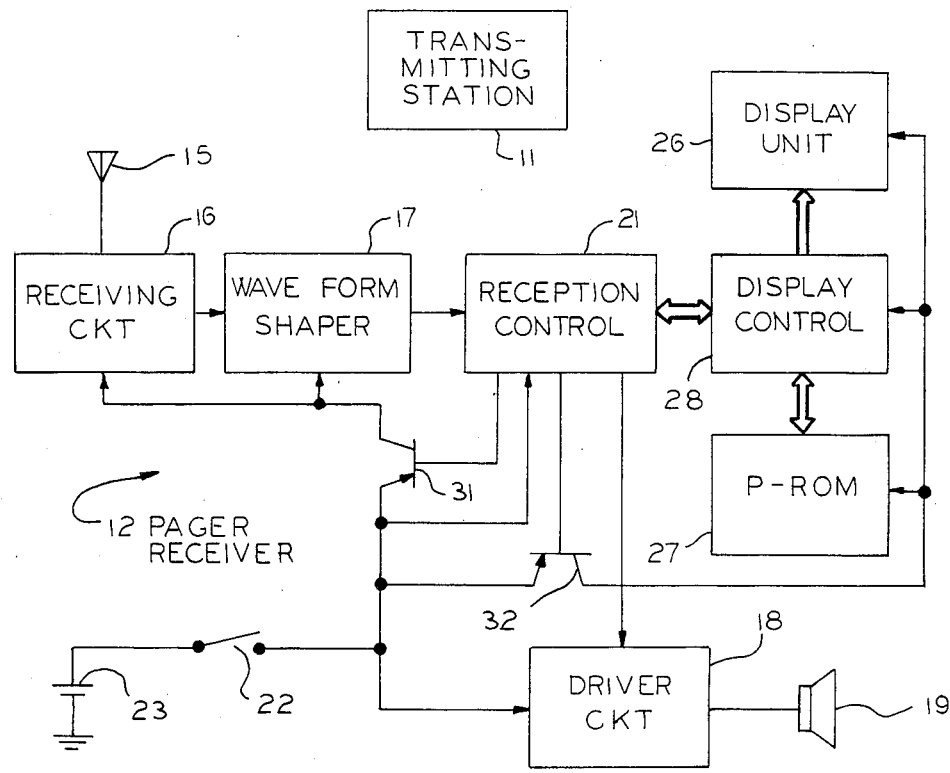
FIG. 1 shows in blocks, together with a transmitting station, a pager receiver according to a preferred embodiment of the instant invention.

Referring to FIG. 1, a paging system comprises a transmitting station 11 having a certain service area. The system further comprises a plurality of pager receivers. A considerable number of the pager receivers are rendered active or operative within the service area during the business hours. Usually, only a few of the pager receivers are kept active in the midnight hours. At any rate, the pager receivers of the system are divided into a predetermined number of groups as described heretobefore. By way of example, let the groups be first through tenth groups. One of the pager receivers of the first group is depicted at 12 (FIG. 1) as a representative of the pager receivers of the system.

A plurality of subscriber substations (not shown) are connected to the transmitting station 11. When a call to a desired one of the active pager receivers of the system originates at one of the subscriber substations, the call is transmitted by the transmitting station 11 over the service area on a radio calling signal. It will be assumed that the calling signal is an FM (frequency modulated) signal.

Figure 2:
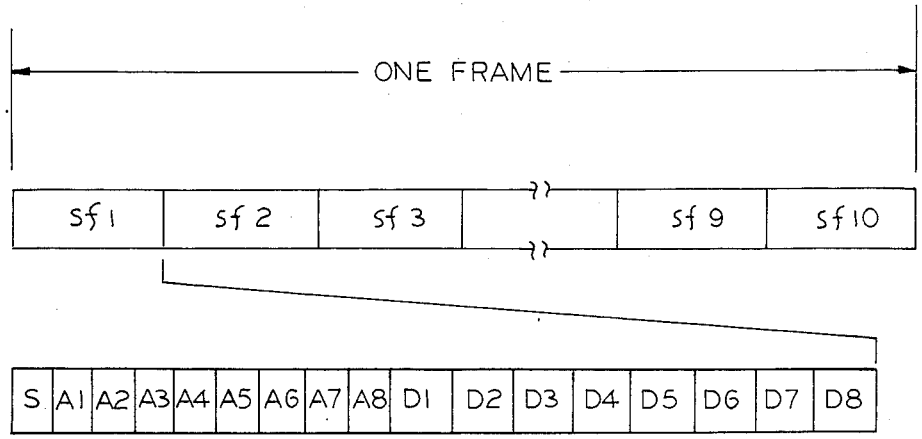
FIG. 2 exemplifies a format of a radio calling signal which is to be received by the pager receiver illustrated in FIG. 1.
Figure 3A:
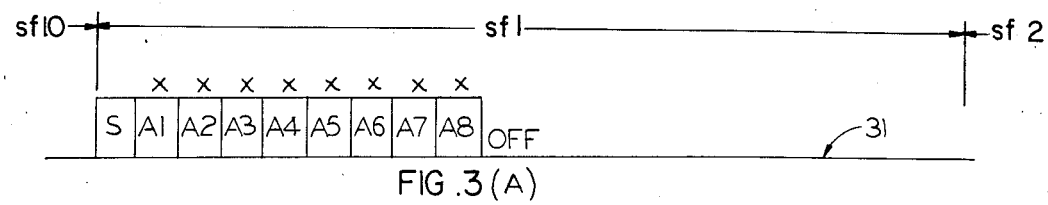
FIG. 3 is a schematic time chart for use in describing operation of a pager receiver which is of the structure depicted in FIG. 1 and is operable according to a more preferred aspect of this invention.
Figure 3B:
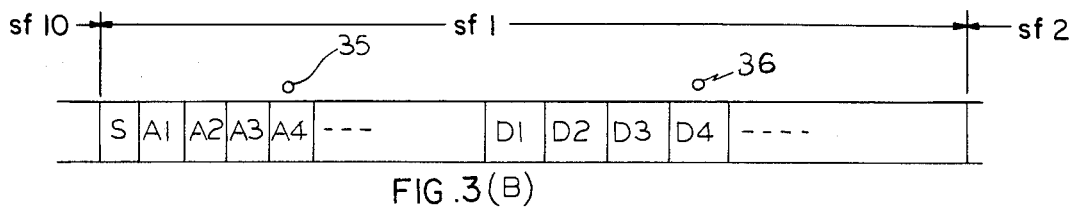
Figure 3C:
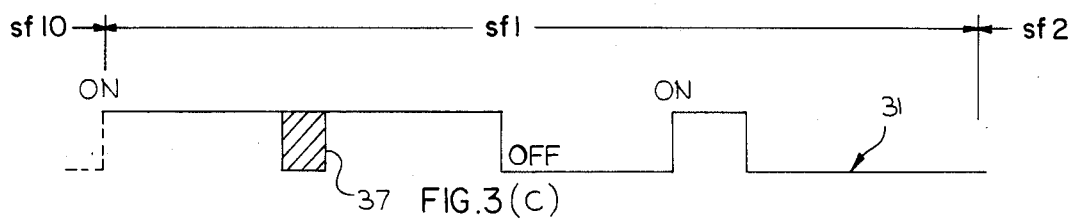
Figure 3D:
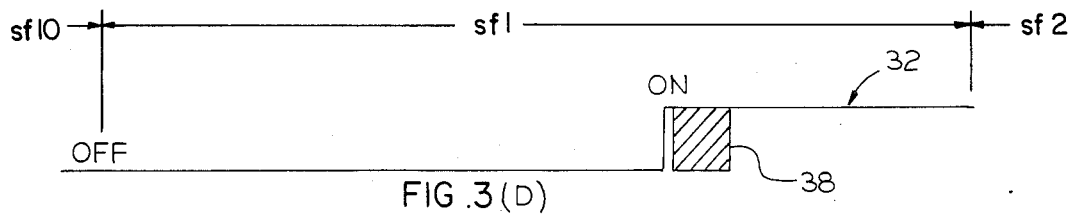
Figure 3E:
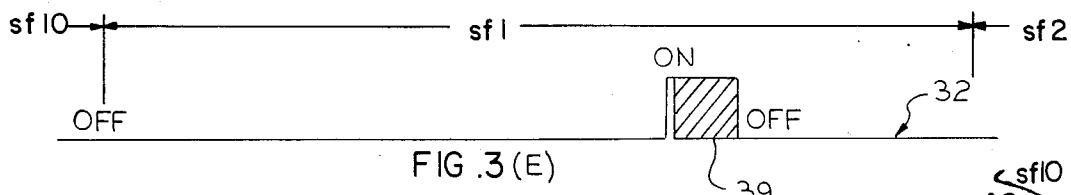
Figure 3F:
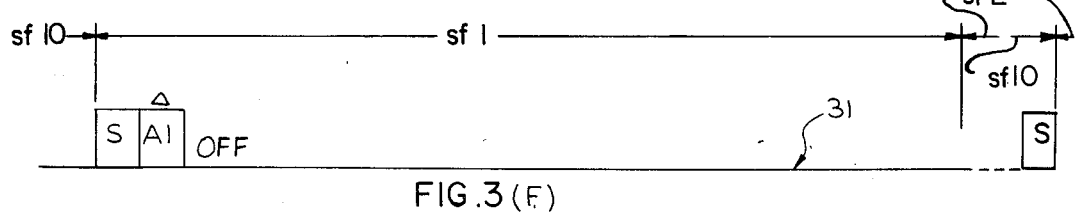

Turning to FIG. 2, each frame of the radio calling signal is transmitted in first through tenth subframes sf1 to sf10 which are allotted to the first through the tenth groups, respectively. As illustrated in detail for the first subframe sf1, each subframe comprises a synchronizing code time slot, such as S, a call code part after the synchronizing code, and a message code part after the call code part.

The synchronizing codes are transmitted in the synchronizing code time slots and have those patterns of binary one and zero bits which are unique to the respective subframes. The pager receivers, such as 12 (FIG. 1), of each group are responsive to the synchronizing code of the subframe which is allotted to that group.

The call code part has a preselected number of time sequentially arranged call time slots or intervals. In the example being illustrated, the call code part of the first subframe sf1 immediately follows the synchronizing code time slot S and consists of first through eighth call time slots A1 to A8. The message code part immediately follows the call code part and consists of first through eighth message time slots or durations D1 to D8 which are in one-to-one correspondence to the first through the eighth call time slots A1 to A8.

In the manner known in the art, the transmitting station 11 (FIG. 1) sends a calling code or word in one of the call time slots of one of the subframes sf1 through sf10 in response to a call which originates at a subscriber substation for a desired one of the active pager receivers of the system that is movable within the service area. Such calling codes are preassigned to the respective pager receivers, active or inactive, of each group. In order so to preassign, each calling code consists of a prescribed number of binary one and zero bits.

The call may or may not be accompanied by a message to be conveyed to the desired pager receiver. In the presence of a message, the transmitting station 11 sends a message code or word in one of the message time slots of the subframe under consideration that corresponds to the call time slot at which the calling code for the desired pager receiver is placed. The message code consists of a certain number of binary one and zero bits which are arranged to represent the message. It is to be noted here that the message, as herein called, should be understood in the broadest sense of the word and may be indicative of control of the desired pager receiver.

It is more preferred, when the calling code or codes actually sent in a subframe is less in number than the call time slots of that subframe, that the calling code be placed according to the so-called first-in first-out scheme in each call time slot which is nearer to the synchronizing code time slot (namely, to a leading time slot of the call code part) than it is to the message time slot and that a blank calling code be placed in each call time slot at which no calling code is present. For instance, the calling code for the receiver 12 is in the fourth call time slot A4 if sent by the transmitting station 11 in response to a call which originates after the beginning of one frame as a fourth, an eighty-fourth (assuming eight call time slots in each subframe), or a like one of the calls for the pager receivers of the first group. The blank calling code should consist of binary one and zero bits arranged in a pattern which is not used as the calling codes for the pager receivers of the group in question. Most preferably, the blank calling code should consist of binary one and zero bits which are arranged as random as possible. Similarly, a blank message code is placed at a message time slot at which no message code is present.

Referring back to FIG. 1, the pager receiver 12 comprises an antenna 15 for receiving the radio calling signal. An ordinary FM receiving circuit 16 is for subjecting the received calling signal to frequency conversion, amplification, and demodulation. The receiving circuit 16 comprises a discriminator (not shown) which produces the demodulated calling signal. A waveform shaper 17 is for shaping the waveform of the demodulated calling signal to produce a reproduction of a digital signal which is produced in the transmitting station 11 to be transmitted as the radio calling signal. Responsive to an alert tone signal which will presently be described, a driver circuit 18 makes a loudspeaker 19 produce an alert tone. The receiving circuit 16, the waveform shaper 17, and the driver circuit 18 are known in the art. For instance, the receiving circuit 16 may be of the type described in U.S. Pat. No. 4,194,153 issued to Masaru Masaki et al and assigned to Nippon Electric Co., Ltd., one of the present assignees. The waveform shaper 17 may be of the structure comprising a low-pass filter and a comparator.

A reception controller 21 is for generating a clock pulse sequence and for establishing bit synchronism of the clock pulses. The reception controller 21 is coupled to the waveform shaper 17 so as to detect the synchronizing code s of the first subframe sf1 (FIG. 2) to provide a reference for use in timing the first through the eighth call time slots A1 to A8 and the first through the eighth message time slots D1 to D8. The reception controller 21 is furthermore for timing the call code part, for detecting the calling code preassigned to the receiver 12 in the first subframe sf1, for deciding that one of the call time slots A1 through A8 as a particular call time slot at which the calling code is detected, for producing the alert tone signal as will later be described, and for producing a first and a second control signal which will shortly be described. The reception controller 21 comprises a call memory (not shown) in which a call indication indicative of detection of the calling code and the particular call time slot are stored. It is possible to implement most of the reception controller 21 by a large-scale integrated semiconductor circuit (LSI).

When a switch 22 is closed to render the receiver 12 active, the reception controller 21 is supplied with the power from a battery 23 carried by the receiver 12. The power is supplied also to the driver circuit 18. The driver circuit 18, however, does not consume the power unless the alert tone signal is delivered thereto from the reception controller 21.

A display unit 26 is for visually displaying a message conveyed to the receiver 12 as a message code at one of the message time slots D1 through D8 that corresponds to the particular call time slot. When the message is represented only by numerals, the display unit 26 may be a twelve-digit seven-segment liquid crystal display. When the message is aplhanumeric, the display unit 26 may comprise a five-by-seven-dot matrix liquid crystal display.

A programmable read-only memory (P-ROM) 27 is for memorizing the call code preassigned to the receiver 12. It may be mentioned here that the receiver 12 may receive a message code and display a translation of the message code as the message according to the key code scheme as called in the art. In this event, a table for the translation is memorized in the read-only memory 27. Furthermore, the read-only memory 27 is for memorizing various modes of operation of the receiver 12. For example, the receiver 12 may be given a function of automatically resetting the alert tone and the displayed message. It is also possible to render the receiver 12 so as not to respond to the message code part of the first subframe sf1 of the received calling signal. Under the circumstances, the modes of operation are memorized in the the read-only memory 27.

A display controller 28 is a one-chip central processing unit coupled to the reception controller 21, the display unit 26, and the read-only memory 27. A program for putting the receiver 12 into operation, is memorized in the display controller 28. Subroutines of the program may be memorized in the read-only memory 27. As will later be described more in detail, the display controller 28 reads the calling code from the read-only memory 27 to supply the read-out calling code to the reception controller 21. After timing of the call code part, the reception controller 21 times the message code part. At a message time slot corresponding to the particular call time slot, the display controller 28 is energized, together with the receiving circuit 16 and the waveform shaper 17, to detect a message code and subject the same to error correction. The display controller 28 comprises a display memory (not shown) for storing the meassage which is represented by the error corrected message code or, as the case may be, given by the translation of the error corrected message code. The display controller 28 delivers the message to the display unit 26 for a visual display as will later be described.

The power is supplied to the receiving circuit 16 and the waveform shaper 17 through a first switching transistor 31, which is controlled by the first control signal. The power is supplied to the display unit 26, the read-only memory 27, and the display controller 28 through a second switching transistor 32 controlled by the second control signal.

Referring furthermore to FIG. 3, the calling codes preassigned to eight pager receivers of the first group are present in the first through the eighth call time slots A1 to A8 of the first subframe sf1 when the traffic is busiest. It may be that none of the calling codes is for the illustrated pager receiver 12 as indicated in FIG. 3 (A) by crosses. Alternatively, the calling code preassigned in the first subframe sf1 to the receiver 12 may be present in one of the call time slots A1 through A8 together with a message code in the message code part. By way of example, let the calling code for the receiver 12 be present in the fourth call time slot A4 as represented in FIG. 3 (B) by a circle 35. The message code under consideration is placed in the fourth message time slot D4 as shown by another circle 36. When the reception controller 21 fails to detect the calling code for the receiver 12 as exemplified in FIG. 3 (A), the reception controller 21 makes the first control signal turn the first switching transistor 31 off or nonconductive at the end of the call code part as will presently be described more in detail.

As illustrated in FIG. 3 (C), the reception controller 21 makes the first control signal render the first switching transistor 31 on or conductive when synchronism of the clock pulse sequence is established after closure of the switch 22. When the reception controller 21 detects the synchronizing code s of the first subframe sf1, the reception controller 21 makes the first control signal keep the first switching transistor 31 in the on state. At the fourth call time slot A4, the reception controller 21 detects the calling code which is preassigned to the receiver 12 and is depicted by a hatched area 37. The reception controller 21 continues timing of the call code part and makes the first control signal turn the first switching transistor 31 off at the end of the call code part, as shown in FIG. 3(C). The reception controller 21 further times the message code part and makes the first control signal turn the first switching transistor 31 again conductive substantially during the fourth message time slot D4.

As shown in FIGS. 3 (D) and (E), the reception controller 21 makes the second control signal keep the second switching transistor 32 in the off state at first. The reception controller 21 makes the second control signal turn the second switching transistor 32 conductive at the fourth message time slot D4. If the display controller 28 detects a message code illustrated by another hatched area 38 at the fourth message time slot D4, the reception controller 21 responds to the detection and makes the second control signal keep the second switching transistor 32 in the on state. If the display controller 28 detects a blank message code depicted by still another hatched area 39 at the fourth message time slot D4, the reception controller 21 responds to the detection and makes the second control signal turn the second switching transistor 32 off at the end of the fourth message time slot D4.

It is now understood that the pager receiver 12 comprises a receiver part 15, 16, and 17 for receiving the radio calling signal, a reception controller 21 coupled to the receiver part for detecting a calling code preassigned to the receiver 12 and for deciding that one call time slot of the call time slots in which the calling code is detected, a display part 26, 27, and 28 coupled to the receiver part through the reception controller 21 for detecting either of a message code and a blank message code in one of the message time slots that corresponds to the afore-mentioned one call time slot, and switching transistors 31 and 32 responsive to the above-described one call time slot for energizing the receiver part and the display part at the above-mentioned one message time slot.

As described before, it is more preferred that the calling code be placed in less numbered call time slot and that the blank calling code be placed in each call time slot at which no calling code is present. In this event, the blank calling code may be memorized in the reception controller 21. When the traffic is not busy, an appreciable number of the blank calling code may be present in the call code part of a subframe. Depending on the circumstances, the blank calling code is placed even in the first call time slot A1 as indicated in FIG. 3 (F) by a triangle.

As soon as the reception controller 21 detects the blank calling code in any one of the call time slots A1 through A8, the reception controller 21 makes the first control signal turn the first switching transistor 31 off as exemplified in FIG. 3 (F). The reception controller 21 subsequently makes the first control signal turn the first switching transistor 31 conductive substantially at a next following first subframe sf1' as shown in FIG. 3 (F) while making the second control signal keep the second switching transistor 32 in the off state.

Figure 4A:
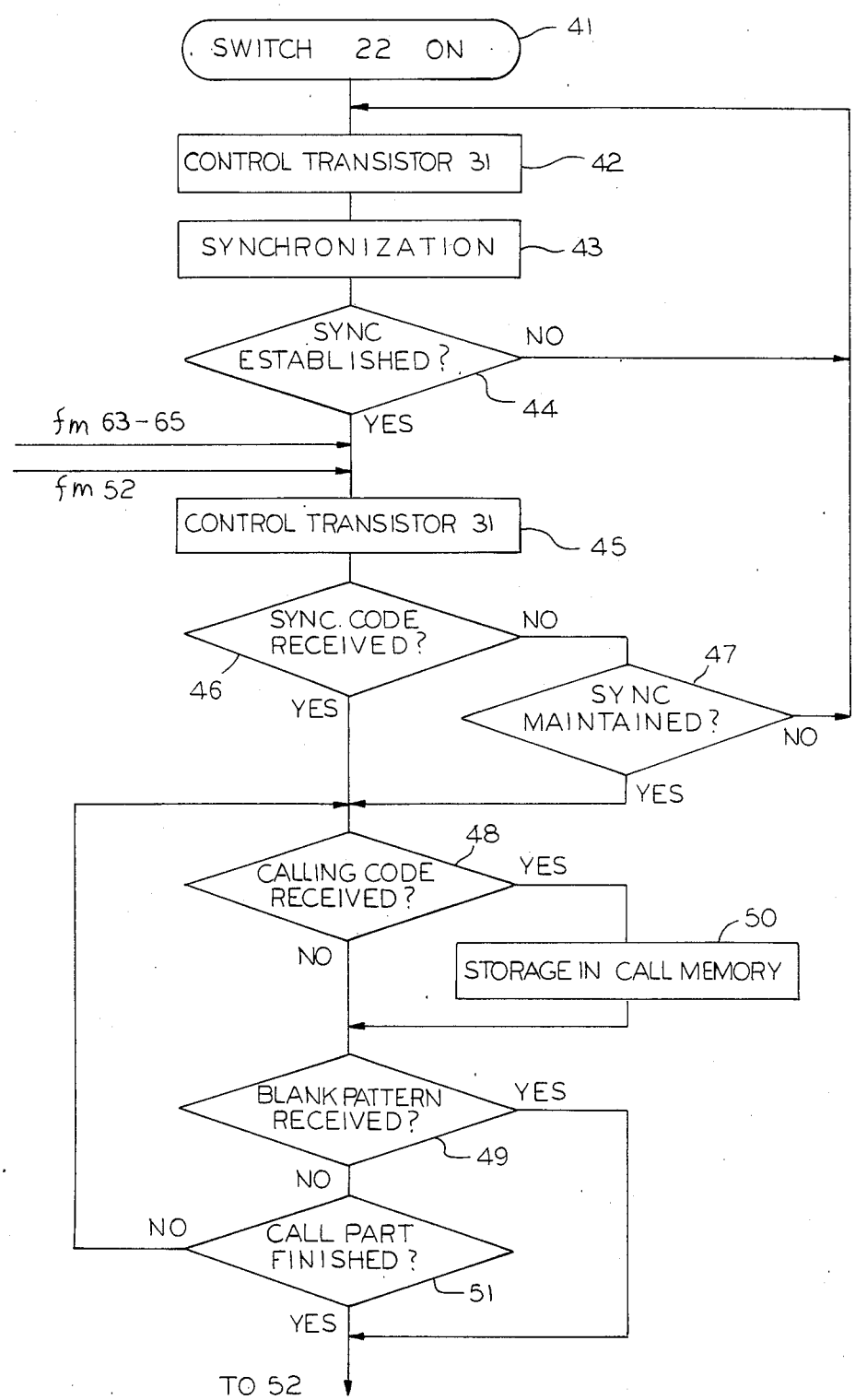
FIG. 4, drawn on two sheets as FIGS. 4 (a) and (b), is a flow chart for use in describing operation of the pager receiver mentioned in conjunction with FIG. 3.
Figure 4B:
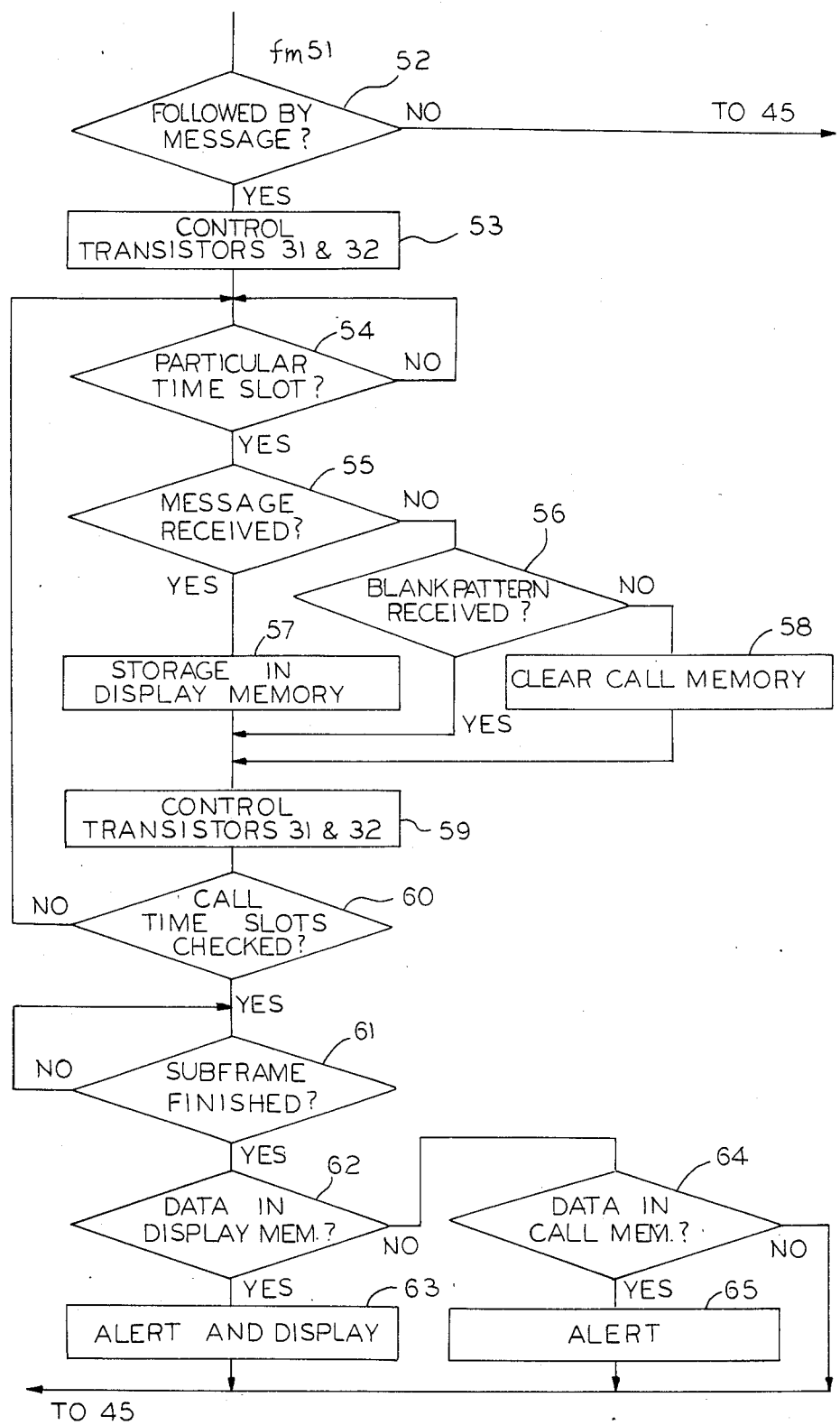

Referring additionally to FIG. 4, it will be presumed that the pager receiver 12 is operable in response to a radio calling signal according to the more preferred aspect of this invention and that the switch 22 is closed at a first stage 41 to put the receiver 12 into operation. The reception controller 21 is energized to turn the first switching transistor 31 instantaneously on as indicated at a second stage 42 while beginning to generate the clock pulse sequence. It is preferred that the reception controller 21 momentarily render the second switching transistor 32 also on to make the display controller 28 transfer the calling code for the receiver 12 and the blank calling code to a memory in the reception controller 21 from the read-only memory 27. The second switching transistor 32 is kept in the off state until an instant which will later be described.

As illustrated at a third stage 43, synchronization of the clock pulse sequence is carried out. Establishment of the synchronism is checked at a fourth stage 44. If not, the stage 44 returns to the second stage 42. If the synchronism is established, the reception controller 21 turns the first switching transistor 31 again on at a fifth stage 45. Except for an on-off control of the first switching transistor 31 to be presently described and operation of the second switching transistor 32, the stages 41 through 45 are known in the art.

The reception controller 21 searches for the synchronizing code s of the first subframe sf1 at a sixth stage 46. If the synchronizing code s is received, the reception controller 21 is put in a state for checking the call time slots A1 through A8 one by one as will shortly be described. Even though the synchronizing code s is not detected, the reception controller 21 remains in this state insofar as the synchronism is maintained as shown at a seventh stage 47. After lapse of a certain duration, the synchronism may go out of order. In this event, the stage 47 returns to the second stage 42.

While checking each call time slot, the reception controller 21 may find either the calling code for the receiver 12 at an eighth stage 48 or the blank calling code at a ninth stage 49. If the calling code is received, the reception controller 21 makes the call memory thereof store, as indicated at a tenth stage 50, a call indication indicative of the reception and a particular call time slot at which the calling code is received.

If the received calling code is not followed by the blank calling code as in the busiest hours of the traffic, the reception controller 21 checks at an eleventh stage 51 whether or not the whole call code part is already dealt with. If not, the search for the calling code and the blank calling code is repeated. Either upon reception of the blank calling code or upon completion of the processes for the whole call code part, the stage 49 or 51 proceeds forward to a twelfth stage 52 at which decision is carried out as regards necessity and unnecessity of checking the message code part for a message code and the blank message code as will shortly be described.

If the blank calling code is received at the ninth stage 49 before reception of the calling code for the receiver 12 as exemplified in connection with FIG. 3 (F), it is unnecessary to carry out the check of the message code part. The stage 52 therefore jumps back to the fifth stage 45 at which the first switching transistor 31 is not put in the above-mentioned on-off controllable state. At first, the reception controller 21 switches the transistor 31 off. Subsequently, the reception controller 21 switches the transistor 31 conductive a little before the beginning of the first subframe sf1' in a next following frame as shown in FIG. 3 (F). The second switching transistor 32 is kept in the off state all the while.

If it is found at the eleventh stage 51 that the whole call code part is processed with neither the calling code for the receiver 12 nor the blank calling code received in the first through the eighth call time slots A1 to A8, it is also unnecessary to carry out the check. The twelfth stage 52 returns to the fifth stage 45.

If the calling code for the receiver 12 is received at the eighth stage 48, it is necessary to carry out the check irrespective of whether or not the detected calling code is followed by the blank calling code. The reception controller 21 puts both the first and the second switching transistors 31 and 32 in on-off controllable states at a thirteenth stage 53. On the other hand, the reception controller 21 times the message code part with reference to the particular call time slot and checks at a fourteenth stage 54 whether or not each message time slot corresponds to the particular call time slot. A little before the leading edge of the corresponding message time slot, the reception controller 21 turns the first and the second switching transistors 31 and 32 conductive as described with reference to FIGS. 3 (D) and (E).

At fifteenth and sixteenth stages 55 and 56, the display controller 28 checks if either a message code or the blank message code is present in the corresponding message time slot. If a message code is received at the fifteenth stage 55, the message is stored in the display memory at a seventeenth stage 57. If neither a message code nor the blank message code is received, the call indication and the particular call time slot stored in the call memory, are cleared at an eighteenth stage 58.

After storage of the message in the display memory at the seventeenth stage 57, the display controller 28 makes the reception controller 21 turn the first switching transistor 31 off while keeping the second switching transistor 32 in the on state as shown at a ninteetnth stage 59. If the blank message code is received at the sixteenth stage 56, the display controller 28 makes the reception controller 21 render both the first and the second switching transistors 31 and 32 off at the ninteenth stage 59. Also after clearance of the call memory at the eighteenth stage 58, the display controller 28 makes the reception controller 21 turn the both switching transistors 31 and 32 off at the ninteenth stage 59.

At a twentieth stage 60, the reception controller 21 checks if or not the message code part is already timed with reference to the first through the eighth call time slots A1 to A8. If already done, the reception controller 21 confirms at a twenty-first stage 61 whether or not the first subframe has lapsed. It may be pointed out here that it is unnecessary for such timing of the message code part and the subframe to supply the reproduction of the digital signal to the reception controller 21 from the waveform shaper 17.

The display controller 28 checks at a twenty-second stage 62 whether or not the message is stored in the display memory. If present, the display controller 28 makes the reception controller 21 deliver the alert tone signal to the driver circuit 18 at a twenty-third stage 63 to make the loudspeaker 19 produce the call tone. At the same time, the display controller 28 makes the display unit 27 visually display the message. If the display memory is empty, the call memory is checked at a twenty-fourth stage 64 for the call indication. If present, the alert tone is produced at a twenty-fifth stage 65.

If the receiver 12 has the automatic resetting function, the display controller 28 automatically clears the content of either the call memory and the display memory (stage 63) or the call memory (stage 65) and stops either the alert tone and the visual display or the call tone. Concurrently, the display controller 28 makes the reception controller 21 turn the first and the second switching transistors 31 and 32 off. The stage 63 or 65 jumps back to the fifth stage 45, at which the first switching transistor 31 is again put in the on-off controllable state.

Attention will now be directed to an average current consumed in a pager receiver of the type described with reference to FIGS. 1 and 2. The current used in the reception controller 21 is about 0.01 mA. The total current used in the receiving circuit 16 and the waveform shaper 17 is about 4 mA. Inasmuch as the call to a pager receiver is only several times a day, it is possible on calculating the average current to neglect the current used upon detection of the call in the receiving circuit 16, the waveform shaper 17, the driver circuit 18, the display unit 26, the programmable read-only memory 27, and the display controller 28. It will be surmised that the pager receivers of the paging system are divided into ten groups as described before.

For a conventional pager receiver referenced hereinabove, the saving ration is 10 to 1. The average current is therefore:

$$(4\ mA \times 1 + 0.01\ mA \times 9)/10 = 0.409\ mA$$

For the pager receiver 12, the saving ratio is about 30 to 1. Therefore, the average current is:

$$(4\ mA \times 1 + 0.01\ mA \times 29)/30 = 0.143\ mA$$

It is understood that the power consumption is reduced to about $\frac{1}{3}$. If the pager receiver 12 is of the type thus far described with reference to FIGS. 1 through 4, the reduction to $\frac{1}{3}$ is for the least favorable case in which the traffic is busiest to render the average current maximum. In the most favorable case in which the call seldom originates at the subscriber substations for the active pager receivers of the system, the saving ratio is about 120 to 1. The average current is therefore;

$$(4\ mA \times 1 + 0.01\ mA \times 119)/120 = 0.0433\ mA$$

This shows that the power consumption is reduced to about 1/9. It will be appreciated that the power consumption is quite astonishingly reduced.

While this invention has so far been described in connection with a few preferred embodiments thereof, it will now readily be possible for one skilled in the art to carry this invention into effect in various other manners. For example, it is possible to use a different format rather than the format of the radio calling signal illustrated with reference to FIG. 2. In this event, the flow chart described with reference to FIG. 4 should accordingly be modified. Above all, codes or patterns different from the synchronizing codes, the calling codes, the message codes, the blank calling code, and the blank message code may be placed between the synchronizing code time slot and the call code part, between the call code part and the message code part, and/or after the message code part. In other words, the call time slots and the message time slots may be either continuously or intermittently time sequentially arranged in each signal section, such as the first subframe sf1, which is intermittently time sequenced in the radio calling signal. Moreover, the pager receivers of each group may further be divided into a certain number of subgroups. In this latter event, each subframe of the radio calling signal should be divided into a plurality of smaller subgroups which are assigned to the respective subgroups. Such smaller subframes may also be called signal sections of the radio calling signal.

What is claimed is:

1. A pager receiver comprising:
   first means for receiving a radio calling signal transmitted in a frame comprising a plurality of subframes, each subframe comprising a call code part and a message code part, said call code part having a preselected number of call time slots, said message code part having a plurality of message time slots corresponding to said call time slots, respectively, said call code part and said message code part being time sequentially arranged, said preselected number being more than two;
   reception controller means for detecting a calling code in said call code part, said calling code being preassigned to said pager receiver identifying the one call time slot of said call time slots in which said calling code is detected, generating a first control signal responsive to the beginning of said subframe during the periods of said call code part and of one message time slot of said message code part that corresponds to said one call time slot, and generating a second control signal during at least a period of said one message time slot in response to the detection of said calling code;
   display controller means coupled to said first means through said reception controller means for detecting either a message code or a blank message code in said one message time slot; and
   power supply means for continuously supplying power to said reception controller means, supplying power to said first means responsive to said first control signal and supplying power to said display controller means responsive to said second control signal.

2. A pager receiver as claimed in claim 1, wherein said reception controller means continuously generates said second control signal until a lapse of said message code part when a message code is detected in said one message time slot, and stops the generation of said second control signal after the lapse of said one message time slot when said blank message code is detected in said one message time slot.

3. A pager receiver as claimed in claims 1 or 2, wherein a blank calling code is placed in each call time slot in which no calling code is present, and wherein said reception controller means also detects said blank calling code in further response to the detection of said blank calling code for stopping the generation of said first control signal after the end of the call time slot in which said blank calling code is detected and, resumes the generation of said first control signal from the beginning of the succeeding subframe which is in the next frame following the previous frame including the previous subframe in turn having the call time slot in which said blank calling code is detected, said succeeding subframe being positioned in said next frame as said previous subframe is positioned in said previous frame.

* * * * *